United States Patent
Adams et al.

(10) Patent No.: US 9,602,719 B2
(45) Date of Patent: Mar. 21, 2017

(54) FORENSIC SIGNATURE

(71) Applicant: HEWLETT-PACKARD DEVELOPMENT COMPANY, L.P., Houston, TX (US)

(72) Inventors: Guy Adams, Bristol (GB); Stephen Pollard, Bristol (GB); Steven J Simske, Fort Collins, CO (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 0 days.

(21) Appl. No.: 14/653,808

(22) PCT Filed: Jan. 31, 2013

(86) PCT No.: PCT/US2013/024066
§ 371 (c)(1),
(2) Date: Jun. 18, 2015

(87) PCT Pub. No.: WO2014/120188
PCT Pub. Date: Aug. 7, 2014

(65) Prior Publication Data
US 2015/0358534 A1    Dec. 10, 2015

(51) Int. Cl.
| | |
|---|---|
| G06K 9/00 | (2006.01) |
| H04N 5/232 | (2006.01) |
| H04N 5/225 | (2006.01) |
| G06K 9/46 | (2006.01) |
| G07D 7/12 | (2016.01) |
| G07D 7/20 | (2016.01) |
| G06K 9/20 | (2006.01) |

(52) U.S. Cl.
CPC ..... H04N 5/23229 (2013.01); G06K 9/00577 (2013.01); G06K 9/2036 (2013.01); G06K 9/46 (2013.01); G07D 7/121 (2013.01); G07D 7/2033 (2013.01); H04N 5/2256 (2013.01)

(58) Field of Classification Search
CPC ............ H04N 5/23229; H04N 5/2256; G07D 7/2033; G07D 7/121; G06K 9/46; G06K 9/00577; G06K 9/2036
See application file for complete search history.

(56) References Cited

U.S. PATENT DOCUMENTS

| | | | |
|---|---|---|---|
| 4,760,248 A | 7/1988 | Swartz et al. | |
| 5,298,761 A | 3/1994 | Aoki et al. | |
| 6,301,018 B1 | 10/2001 | Maeda et al. | |
| 7,028,188 B1 | 4/2006 | Moore | |
| 7,286,697 B2 | 10/2007 | Guetta | |
| 8,224,018 B2 * | 7/2012 | Rhoads | G06K 9/00577 382/100 |

(Continued)

OTHER PUBLICATIONS

A Study of the Interaction of Paper Substrates on Printed Forensic imaging.

(Continued)

*Primary Examiner* — Shefali Goradia
(74) *Attorney, Agent, or Firm* — Michael A. Dryja

(57) ABSTRACT

A series of images of an object are captured using illumination sources. The series of images correspond to different relative orientations of the object and the illumination sources. A forensic signature for the object is generated using one or more of the series of images. The forensic signature is unique to the object.

20 Claims, 3 Drawing Sheets

(56) References Cited

U.S. PATENT DOCUMENTS

| | | | |
|---|---|---|---|
| 8,798,328 B2* | 8/2014 | Simske | G06K 9/00577 |
| | | | 382/100 |
| 8,818,047 B2* | 8/2014 | Simske | G06K 9/18 |
| | | | 382/112 |
| 2003/0152252 A1 | 8/2003 | Kondo et al. | |
| 2003/0219145 A1* | 11/2003 | Smith | G06K 9/00577 |
| | | | 382/100 |
| 2009/0257642 A1 | 10/2009 | Sugita | |
| 2011/0019905 A1 | 1/2011 | Stierman et al. | |
| 2012/0212324 A1* | 8/2012 | Pollard | G06K 9/00161 |
| | | | 340/5.86 |
| 2014/0348395 A1* | 11/2014 | Pollard | G06K 9/00442 |
| | | | 382/112 |

OTHER PUBLICATIONS

Guy Adams et al., "Forensic Document Demonstrator".
Imaging and analysis of forensic striation marks.
Print Biometrics: Recovering Forensic Signatures from Halftone Images.
Print Signatures for Document Authentication.
Printer and Scanner Forensics.
S.J. Simska and G. Adams, High-Resolution Glyph-Inspection Based Security System IEEE ICASSP, 2010.
Stephen B Pollard et al., "Model Based Print Signature Profile Extraction for Forensic Analysis of Individual Text Glyphs".

* cited by examiner

FORENSIC SIGNATURE

BACKGROUND

Forensic analysis of an object can be used for a variety of different purposes, including the detection of counterfeiting, warranty fraud, product tampering, smuggling, and product diversion. In general, forensic analysis includes authenticating an object. This authentication can be performed to ensure that the object is what it is purported to be, that the object has not been tampered with, and so on.

DETAILED DESCRIPTION

As noted in the background section, forensic analysis of an object includes authentication of the object. One way by which an object can be authenticated is to employ a forensic signature of the object that is unique to the object. When the object is to be authenticated, the forensic signature is generated and compared to a known reference forensic signature for the object.

A forensic signature may be generated based on a forensic mark of the object. For instance, as to print media like paper, the forensic mark may be output thereon using toner, ink, or another type of colorant applied by a printing device. The forensic signature is generated from an image of the forensic mark on the object.

For example in the approach described in S. B. Pollard, et al., "Model based print signature profile extraction for forensic analysis of individual text glyphs," Proceedings of the IEEE International Workshop on Information Forensics and Security 2010, a model of the outline of the forensic mark is used to precisely locate the forensic mark in the image and thus recover a forensic signature that corresponds to the same physical locations relative to the object and independent of the rotation and translation of the object within the image.

This approach has at least two disadvantages. First, although the model-based approach ensures that the forensic signature is measured relative to the forensic mark, the relative orientation of the object with respect to the illumination means that the image of the object will vary due to the three-dimensional (3D) microstructure of the object and the inevitable directionality of the illumination. As a result, the orientation of the object when an image thereof is captured for generating the forensic signature may have to be similar to the object's orientation when an image thereof was captured when generating the reference forensic signature. Otherwise, the authentication process may yield false negatives in which the authentic object fails authentication. Second, just two dimensions (2D) of the object—and thus of the forensic mark thereon—may be captured within the image, which can result in the authentication process being susceptible to false positives in which copies of the forensic mark in particular pass authentication.

Disclosed herein are techniques that at least lessen these problems. For example, a forensic signature that is dependent upon at least two-and-a-half dimensions (2.5) of an object can be captured within a series of images thereof, resulting in the authentication process being more robust against the false positives described above. Second, the forensic signature is generated using the series of images of the object, resulting in the signature being orientation invariant so that the authentication process is more robust against the false negatives described above.

Figure 1:
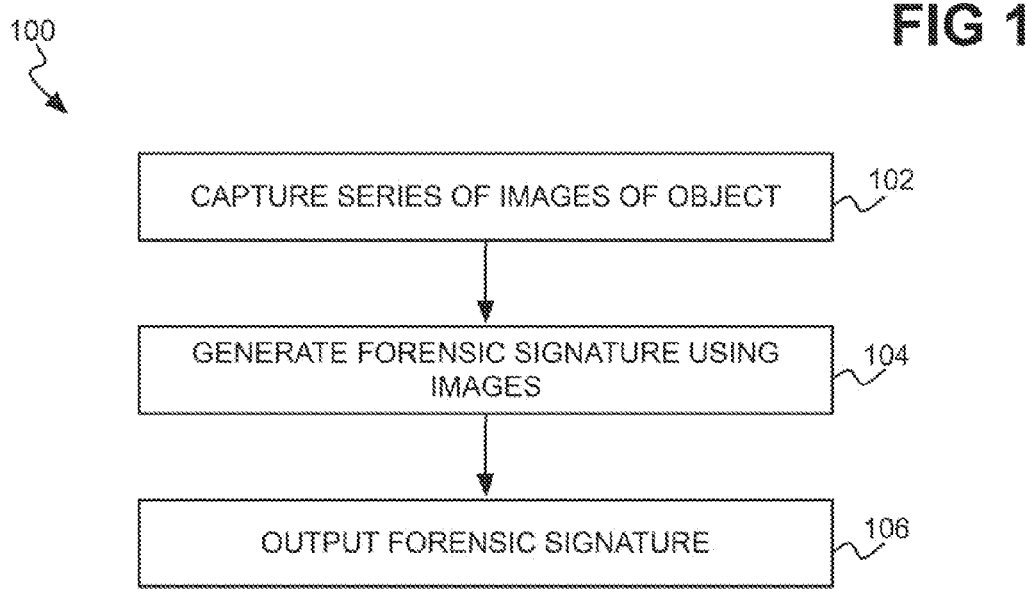
FIG. 1 is a flowchart of an example method for generating a forensic signature for an object.

FIG. 1 shows an example method 100 for generating a forensic signature for an object. The method 100 may be implemented at least in part as a computer program stored on a non-transitory computer-readable data storage medium and executable by a processor of a computing device. The object may be a print medium, such as paper, on which colorant, like toner or ink, has been output to form a forensic mark thereon.

A series of images of the object are captured using multiple illumination sources (102). The series of images correspond to different relative orientations of the object and the illumination sources. The images can reflect properties of the object in at least 2.5D, such as in three dimensions (3D). For example, where the object is a print medium having a forensic mark formed thereon via colorant, the at least 2.5D of the object can include a portion of a 3D microstructure of a surface of the substrate of the print medium on which the colorant has been output.

A forensic signature for the object is generated using the series of images (104). The forensic signature is unique to the object itself, even as compared to other instances of the same object type, such as two instances of the same general type of object, like two different dollar bills as one example. The forensic signature is orientation invariant by more than a predetermined confidence threshold, such as ninety percent as one example. This means that regardless of the physical orientation of the object when the images thereof are captured, the same forensic signature (within the aforementioned confidence threshold) is generated. The orientation invariance of the forensic signature is due to the signature being generated using images that correspond to different relative orientations of the object and the illumination sources, and in addition can further be due to the approach by which the signature is generated.

The forensic signature can be generated using the series of images of the object by extending an approach used to generate a forensic signature using a single image. One such approach is a shape warp code (SWC) approach, which is described in detail in the S. B. Pollard, et al., paper referenced above. In this SWC approach, a total variance for each code section of a number of code sections is determined from an image of an object. Each such code section corresponds to an area of the image relative to the location of the forensic mark. The mean of such variances over the code sections can then be used to normalize and quantize the individual variances for each code section to generate the SWC.

This SWC approach can be extended so that the total variance for each code section is determined based on the series of images of the object that have been captured. For instance, the total variance at each code section may be determined as a composite variance over the series of images. The total variance at each code section may be determined from a minimum total variance value among the images, or from a maximum total variance value among the images. In each of these SWC-oriented approaches, the 3D microstructure of the surface of the substrate of the object may not be preserved within the forensic signature. That is, the forensic signature does not depend on the microstructure of the surface and so could in theory be spoofed by a precise 2D print that mimics the appropriate properties of image variance.

By comparison, the total variance at each code section may be replaced by a range of the total variance at each code section over the series of images. Or, it may be replaced by the variance in the range of image intensities among the different images. In this type of SWC-oriented approach, the 3D microstructure of the surface of the substrate of the object is preserved within the forensic signature. In all these SWC-oriented approaches, because sufficiently similar images (i.e., within more than a confidence threshold) of the object are captured regardless of the object's orientation during image capture, the resulting forensic signature has rotation invariance.

Another approach to generate the forensic signature using the series of images of the object is a photometric stereoscopic approach. A photometric stereoscopic approach estimates both the surface normal of an object and its viewpoint invariant albedo (i.e., the reflection coefficient of a diffuse surface of an object) by observing the object under different lighting conditions, to which the images of the object that have been captured correspond. This approach is described in detail in R. J. Woodham, "Photometric method for determining surface orientation from multiple images," Optical Engineering, volume 19, number 1, January/February 1980.

A forensic signature can be derived either from the albedo or from a scalar field derived from the surface normal, such as the cosine of the surface normal with respect to the z-axis of the camera coordinate frame that is determined from the dot product of the two unit vectors. In this photometric stereoscopic approach, the 3D microstructure of the surface of the substrate of the object is not preserved within a forensic signature derived from the albedo while it is preserved in a forensic signature derived from the surface normal. As in the SWC-oriented approaches, because a viewpoint invariant description of the object is captured regardless of the object's orientation during image capture, the resulting forensic signature is rotation invariant.

The forensic signature for the object is output (106). If the object is being authenticated, then the forensic signature that has been generated and output may be compared to a reference forensic signature for the object. If the object is known to be authentic, then the forensic signature that has been generated and output may be the reference forensic signature itself.

Figure 2A:
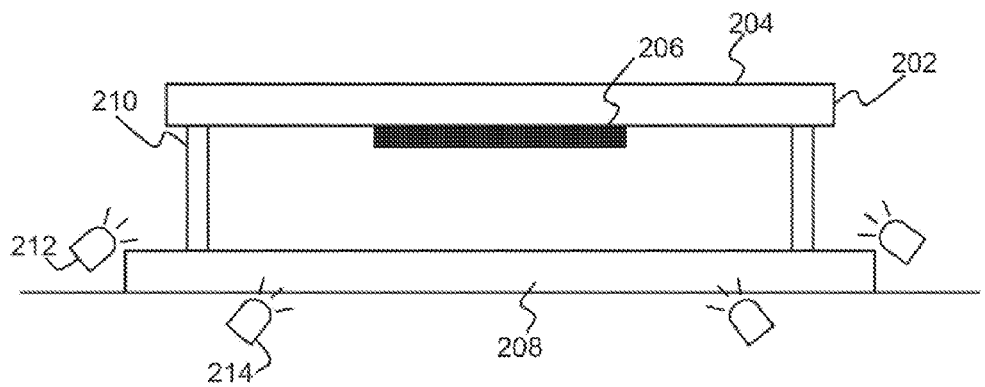
FIGS. 2A and 2B are diagrams of different views illustrating an example of how images of an object are captured to correspond to different physical orientations of the object.
Figure 2B:
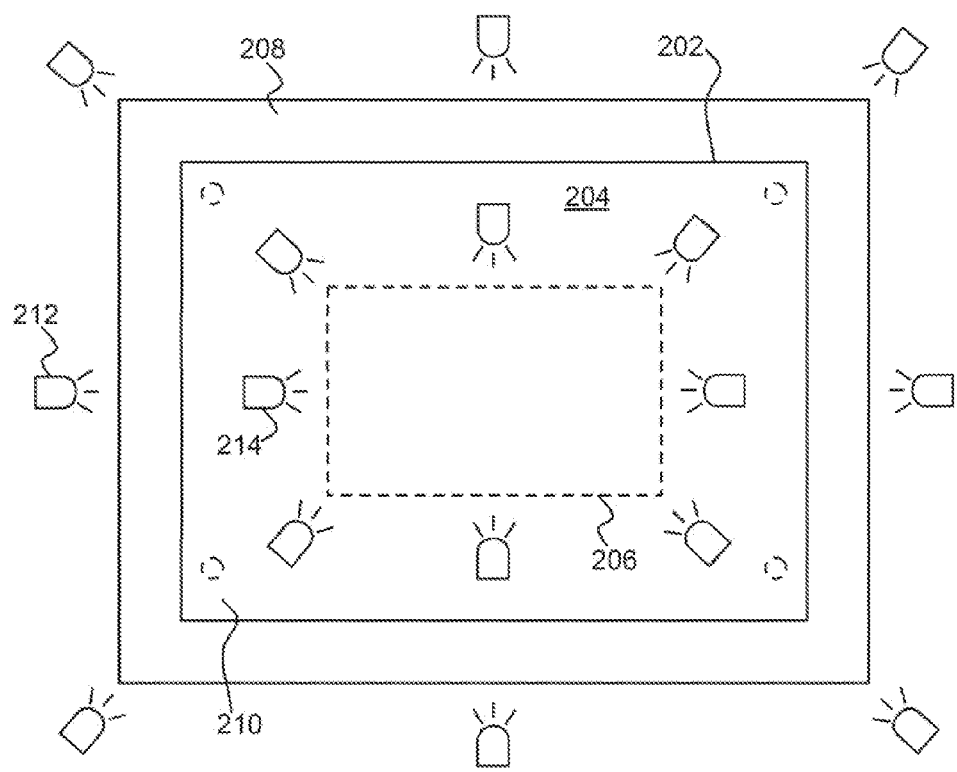

FIGS. 2A and 2B show a front view and a top view, respectively, of an example of how to capture a series of images that correspond to different relative orientations of the object and the illumination sources. The object in FIGS. 2A and 2B is a print medium 202, such as paper, that includes a substrate 204 and a forensic mark 206 formed thereon via colorant like ink or toner. The print medium 202 is disposed incident to an optical capture surface 208, which may be a transparent or at least translucent material such as glass or plastic. In the example of FIG. 2A, the print medium 202 does not contact the optical capture surface 208 because it rests against posts 210, which form an example mechanism to create a small gap between the medium 202 and the surface. The optical capture surface 208 can be part of a Dyson relay contact imaging device (DrCID) in one implementation, as is described in more detail later in the detailed description.

A number of illumination sources 212 are positioned around the optical capture surface 208, and a number of illumination sources 214 are positioned below and inline with the optical capture surface 208. The illumination sources 212 and 214 can be light-emitting diodes (LEDs), for instance. Although the illumination sources 212 as well as the illumination sources 214 are depicted in FIGS. 2A and 2B, in different implementations just the sources 212 or just the sources 214 may be present. While the illumination sources 214 are depicted just behind the optical capture surface 208, in practice they can be located at any appropriate position.

The gap between the optical capture surface 208 and the print medium 202 resulting from the medium 202 resting against the posts 210 exists so that there is a non-parallel and non-perpendicular angle between the illumination sources 212 and the medium 202. By comparison, if just the illumination sources 214 are present, the posts 210 can be absent, because there is a non-parallel and non-perpendicular angle between the illumination sources 214 and the medium 202 even when the print medium 202 rests directly against the optical captures surface 208. The reason for having such a non-parallel and non-perpendicular angle between the illumination sources 212 and 214 and the print medium 202 is described later in the detailed description.

Each image of the print medium 202 is captured by turning on different illumination sources 212 and 214 while sensing or detecting the image through the optical capture surface 208. In one implementation, each image is captured by turning on just one of the illumination sources 212 and 214. In another implementation, each image is captured by turning on different combinations of one or more of the illumination sources 212 and 214. Different illumination sources 212 and 214 can be illuminated in accordance with different patterns for particular types of the print medium 202. Because each image is captured when different illumination sources 212 and 214 are turned on (and the rest turned off), a different relative orientation of the object and illumination is captured within each image.

The images of the print medium 202 are captured by ensuring that the corresponding illumination sources 212 and/or 214 are turned on in such a manner that the same images (within a confidence threshold) are captured regardless of how the print medium 202 is oriented incident to the optical capture surface 208. For example, each illumination source 212 and 214 may be turned on in sequence. Therefore, even if the print medium 202 were rotated ninety or one hundred eighty degrees in FIG. 2B, then similar images of the medium 202 would be captured. This at least partially causes the forensic signature for the object that is generated from the images to be orientation invariant.

Because of the non-perpendicular and non-parallel angle between the illumination sources 212 and 214 and the print medium 202, at least a portion of the 3D microstructure of the surface of the substrate 204 on which the forensic mark 206 has been formed is captured within each image. As such, the images capture the print medium 202 in a way that reflects at least 2.5D: the 2D of the surface of the substrate 204 on which the forensic mark 206 has been formed, and at least a portion of the third dimension perpendicular thereto in which the microstructure of the surface is observable. The 3D microstructures of surfaces of substrates of even purportedly identical print media are different, owing to the manufacturing techniques in which such print media are made. Therefore, this can ensure that the forensic signature for the print medium 202 is unique to just the medium 202 itself when desired, where the forensic signature generation approach reflects these at least 2.5D.

Figure 3:
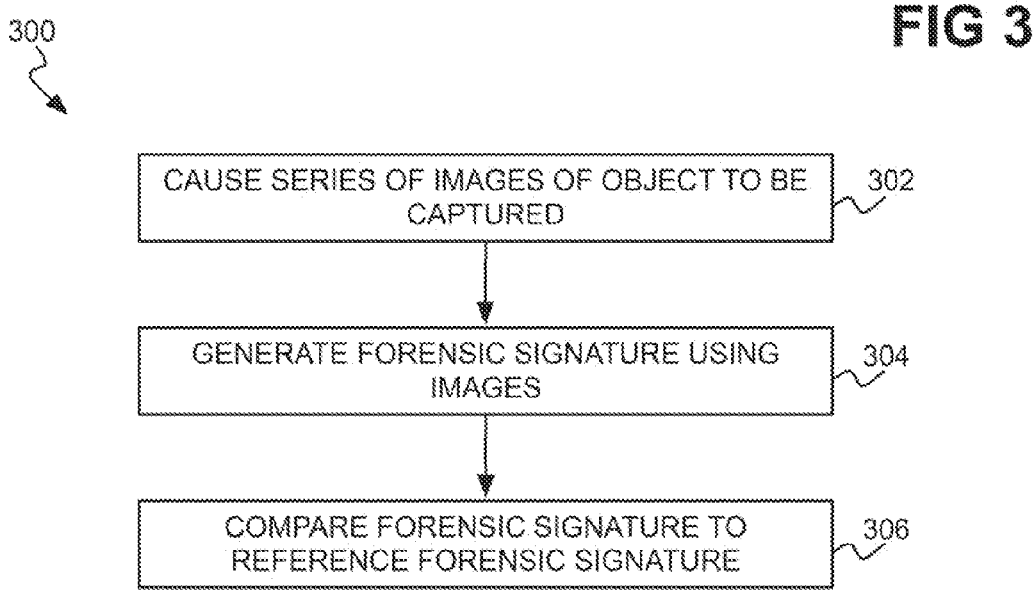
FIG. 3 is a flowchart of an example method for authenticating an object using a forensic signature.

FIG. 3 shows an example method 300 for authenticating an object. As with the method 100, the method 300 can be implemented as a computer program stored on a computer-readable data storage medium and executed by a processor. The method 300 causes a series of images of an object to be captured (302), as described above. The method 300 generates a forensic signature for the object using the series of images (304), as also described above.

The method 300 compares the forensic signature for the object to a reference forensic signature to authenticate the object (306). The reference forensic signature was previously generated as to the authentic object itself. If the forensic signature that has been generated matches the reference forensic signature, then it is said that the object has been successfully authenticated. If the forensic signature does not match the reference forensic signature, then it is said that the object has not been successfully authenticated.

For example, the object may be a unique piece of original artwork. The reference forensic signature is generated from images of the original artwork itself. A party may present artwork that is purportedly the same original artwork. To determine if the presented artwork is the original artwork, a forensic signature is generated from images of the presented artwork and compared to the reference forensic signature.

As another example, the object may be paper currency. The reference forensic signature is generated from images of authentic such currency. A party may present a piece of currency that is purportedly authentic. To determine if the presented piece of currency is not counterfeit, a forensic signature is generated from images of the presented piece of currency and compared to the reference forensic signature for this same piece of currency.

As a third example, the object may be a pharmaceutical pill or other object that is imprinted on via an embossing or debossing technique, that is molded or cast, or formed in another manner. The reference forensic signature is generated from images of such pills or other objects. A party may present a pill that is purportedly authentic. To determine if the presented pill is not counterfeit (i.e., not a knockoff), a forensic signature is generated from images of the presented pill and compared to the reference forensic signature for this same pill.

Figure 4:
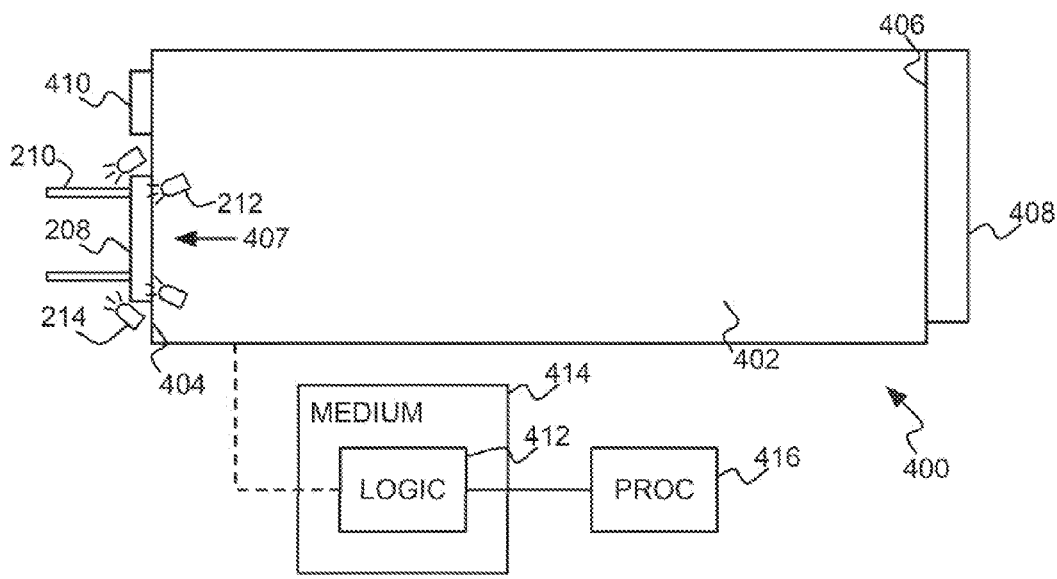
FIG. 4 is a non-perspective diagram of an example apparatus to capture images of an object for generating a forensic signature.

FIG. 4 shows a non-perspective view of an example apparatus 400 that can capture a series of images to generate a forensic signature of an object as has been described. The apparatus 400 is specifically a type of DrCID. A DrCID is described in detail in G. Adams, "Hand held Dyson relay lens for anti-counterfeiting," Proceedings of IEEE International Conference on Imaging Systems and Techniques (IST), Jul. 1-2, 2010. The apparatus 400 includes a tubular body 402 having opposing ends 404 and 406.

An aperture 407 is positioned at the end 404 of the tubular body 402. The optical capture surface 208 that has been described is positioned at the aperture 407. The apparatus 400 includes the posts 210 and the illumination sources 212 and/or 214 that have also been described. A mirror 408 is positioned at the end 406 of the tubular body 402, whereas a sensor 410 is positioned at the other end 404. At least the tubular body 402, the aperture 407, the mirror 408, and the sensor 410 can be said to constitute an imaging device.

In operation, logic 412 of the apparatus 400, which can be implemented in software and/or hardware, controls the illumination sources 212 and/or 214 to illuminate in different patterns and causes the sensor 410 to correspondingly capture a series of images of an object placed incident to the optical capture surface 208. Light from the illumination sources 212 and/or 214 is reflected by the object through the optical capture surface 208 and the aperture 407, which is reflected then by the mirror 408 before being detected by the sensor 410 to result in a captured image of the object. Once the images have been captured, the logic 412 may further generate the forensic signature in a manner as described above.

In the example depicted in FIG. 4, as to implementation of the logic 412, the logic 412 can be processor-executable code that is stored on a computer-readable data storage medium 414 and executed by a general-purpose microprocessor 416. However, as another example, the logic 412 can be implemented via hardcoding into a hardware medium. Such hardware media can include, for instance, application-specific integrated circuits (ASICs) and field-programmable gate arrays (FPGAs), among others.

The example apparatus of FIG. 4 can be a type of DrCID, as noted above. An apparatus to capture the images and generate a forensic signature may be a different type of device as well. For example, other implementations may employ other types of optical systems, such as microscopes, and so on.

The techniques that have been described above employ more than one of the series of images on which basis to generate a forensic signature. However, these techniques can be extended so that just one of the series of images is employed to generate the forensic signature. In one implementation, a single image of the series can be selected on which basis a forensic signature is generate and that provides for the forensic signature being optimal by a predetermined measure, regardless of whether or not orientation invariance is sustained.

Figure 5:
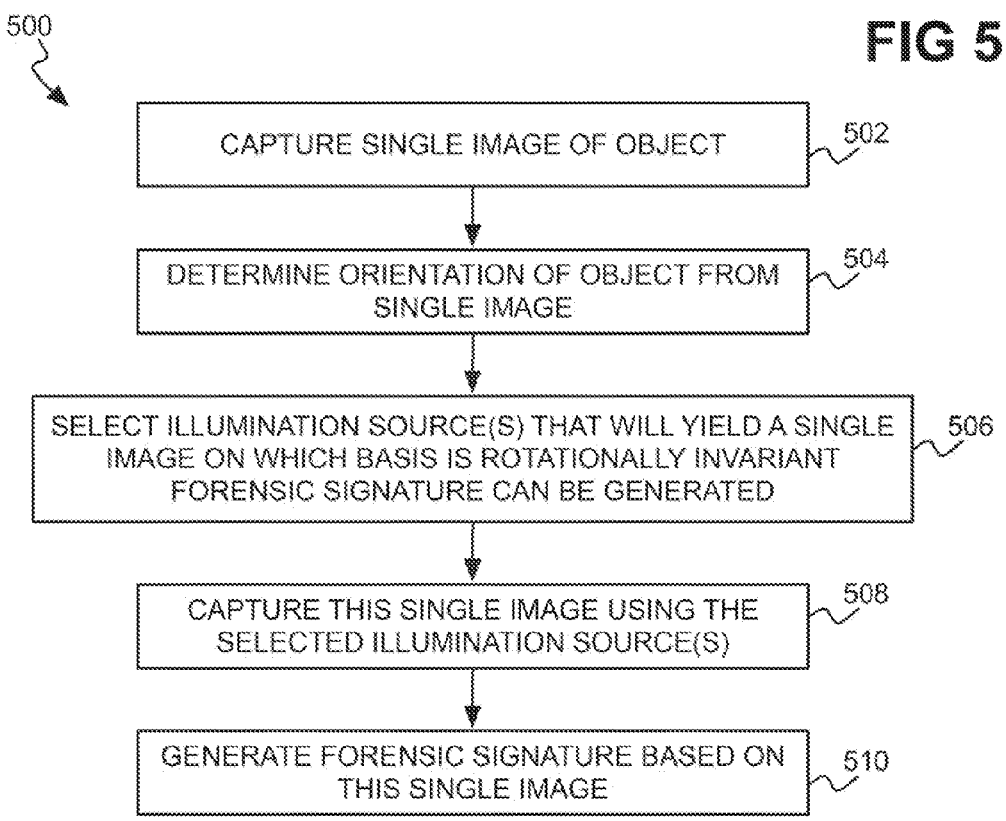
FIG. 5 is a flowchart of another example method for generating a forensic signature for an object.

FIG. 5, by comparison, shows an example method 500 in accordance with another implementation in which a single image can be used to generate the forensic signature while still maintaining orientation invariance. In the method 500, an initial single image of an object is captured (502), using any combination of the illumination sources being turned on, such as all the illumination sources as one example. The orientation and position of the object is determined from this initial image (504). For instance, the approach described in the S. B. Pollard, et al., paper referenced above can be employed to determine the orientation and position.

One or more of the illumination sources are then particularly selected that will be turned on when another single image is captured (506). The selected illumination source or sources are selected so that the relative orientations of the illumination sources and the object remain similar by more than a threshold independent of the rotation and translation of the object within the image. As such, a forensic signature generated from such a single image is itself orientation invariant.

Therefore, another single image is captured using the selected illumination source or sources (508), and the forensic signature is generated based on just this single image (510). The single image of the object captured in part 502 is therefore not used to actually generate the forensic signature, but rather to select which illumination source or sources should be turned on to yield an image—captured in part 508—that will result in orientation invariance. The forensic signature itself, however, is generated just from this latter single image, captured in part 510.

It is noted that the method 500 is consistent with but varies slightly from the previously described method 100, insofar as a series of images are still captured because the images captured in parts 502 and 508 constitute this series of images. However, just the image captured in part 508 is used to generate the forensic signature in part 510 in the method 500. The authentication process of the method 300 is likewise similar for a forensic signature generated using the method 500.

We claim:

1. A method comprising:
capturing a series of images of a print medium using an imaging device, a first plurality of illumination sources located around a surface of the imaging device, and a second plurality of illumination sources located below the surface of the imaging device,
wherein capturing each image in the series of images includes turning on a different combination of the first and second pluralities of illumination sources and capturing the respective image of the print medium through the surface of the imaging device, the series of images corresponding to different orientations of the print medium relative to the first and second pluralities of illumination sources;
generating, by a processor, a forensic signature for the print medium using the series of images, resulting in the forensic signature of the print medium being orientation invariant; and
outputting the forensic signature for the print medium.

2. The method of claim 1, wherein the forensic signature is orientation invariant due to having been generated using the series of images that correspond to different relative orientations of the print medium and the first and second pluralities of illumination sources.

3. The method of claim 1, wherein the series of images are captured in at least two-and-a-half dimensions (2.5D).

4. The method of claim 1, wherein a colorant has been output to form a forensic mark on the print medium, and the series of images each capture a portion of a three-dimensional (3D) microstructure of a surface of a substrate of the print medium on which the colorant has been output.

5. The method of claim 1, wherein the imaging device is a Dyson relay contact imaging device.

6. The method of claim 1, wherein generating the forensic signature for the print medium comprises employing a shape warp code (SWC) approach in which a total variance for each code section of a plurality of code sections is determined based on the series of images.

7. The method of claim 6, wherein employing the SWC approach comprises determining the total variance for each code section based on one of:
a combined variance over the series of images at each code section;
a range of the total variance over the series of images at each code section;
a minimum value of the series of images at each code section; and
a maximum value of the series of images at each code section.

8. The method of claim 1, wherein generating the forensic signature for the print medium comprises employing a photometric stereoscopic approach based on the series of images.

9. The method of claim 1, wherein different combinations of the first and second pluralities of illumination sources are turned on such that same images are captured for multiple orientations of the print medium relative to the surface of the imaging device.

10. The method of claim 1, further comprising:
prior to capturing the series of images of the print medium, placing the print medium on posts to create a gap between the print medium and the surface of the imaging device.

11. The method of claim 1, further comprising comparing the forensic signature to an authentic forensic signature to authenticate the print medium.

12. An apparatus comprising:
an imaging device having an optical capture surface;
a first plurality of illumination sources positioned around the optical capture surface;
a second plurality of illumination sources positioned below the optical capture surface; and
a processor to:
cause the imaging device to capture a series of images of the print medium, wherein to capture each image in the series of images of the print medium, the processor is to turn on a different combination of the first and second pluralities of illumination sources and cause the imaging device to capture the respective image of the print medium through the optical capture surface, the series of images corresponding to different orientations of the print medium relative to the first and second plurality of illumination sources; and
generate a forensic signature for the print medium using the series of images of the print medium, resulting in the forensic signature of the print medium being orientation invariant.

13. The apparatus of claim 12, further comprising posts attached to the imaging device to place the print medium thereon and to create a gap between the print medium and the optical capture surface of the imaging device.

14. The apparatus of claim 12, wherein the imaging device comprises a Dyson relay contact imaging device (DrCID) comprising:
a tubular body having a first end and a second end;
an aperture positioned incident to optical capture surface at the first end of the tubular body;
a mirror positioned at the second end of the tubular body; and
a sensor positioned at the first end of the tubular body.

15. The apparatus of claim 12, wherein the different combinations of the first and second pluralities of illumination sources are turned on such that same images are captured within a confidence threshold for multiple orientations of the print medium incident to the optical capture surface.

16. A non-transitory computer-readable data storage medium storing instructions that when executed by a processor cause the processor to:
cause an imaging device to capture a series of images of a print medium using a first plurality of illumination sources positioned around an optical capture surface of the imaging device and a second plurality of illumination sources positioned below the optical capture surface of the imaging device,
wherein to capture each image in the series of images of the print medium, the instructions are to cause processor to turn on a different combination of the first and second pluralities of illumination sources and cause the imaging device to capture the respective image of the print medium through the optical capture surface, the series of images corresponding to different orientations of the print medium relative to the first and second pluralities of illumination sources; and generate a forensic signature for the print medium using one or more of the series of images, resulting in the forensic signature of the print medium being orientation invariant.

17. The non-transitory computer-readable data storage medium of claim 16, wherein the imaging device is a Dyson relay contact imaging device (DrCID).

18. The non-transitory computer-readable data storage medium of claim 16, wherein to generate the forensic signature for the print medium, the instructions are to cause the processor to employ a shape warp code (SWC) approach in which a total variance for each code section of a plurality of code sections is determined based on the series of images.

19. The machine-readable non-transitory storage medium of claim 16, wherein the instructions are to cause the processor to select a subset of the first and second pluralities of illumination sources to be illuminated when capturing a particular image within the series.

20. The machine-readable non-transitory storage medium of claim 16, wherein the instructions are to cause the processor to authenticate the print medium by comparing the generated forensic signature to a reference forensic signature.

\* \* \* \* \*